US010460098B1

(12) United States Patent
Wang (10) Patent No.: US 10,460,098 B1
(45) Date of Patent: Oct. 29, 2019

(54) LINKING DEVICES USING ENCRYPTED ACCOUNT IDENTIFIERS (71) Applicant: Google Inc., Mountain View, CA (US)

(72) Inventor: Gang Wang, Frederick, MD (US)

(73) Assignee: Google LLC, Mountain View, CA (US)

(*) Notice: Subject to any disclaimer, the term of this patent is extended or adjusted under 35 U.S.C. 154(b) by 116 days.

(21) Appl. No.: 14/825,820

(22) Filed: Aug. 13, 2015

Related U.S. Application Data (60) Provisional application No. 62/039,870, filed on Aug. 20, 2014.

(51) Int. Cl.
G06F 21/45 (2013.01)
H04L 29/06 (2006.01)
H04L 9/32 (2006.01)

(52) U.S. Cl.
CPC ............ *G06F 21/45* (2013.01); *H04L 9/3226* (2013.01); *H04L 63/0876* (2013.01)

(58) Field of Classification Search
CPC .. H04L 9/3226; H04L 63/0876; H04L 2209/80
USPC .......................................... 726/4, 5, 15, 22
See application file for complete search history.

(56) References Cited

U.S. PATENT DOCUMENTS

| | | | |
|---|---|---|---|
| 5,408,950 | A | 4/1995 | Porto |
| 5,892,900 | A | 4/1999 | Ginter et al. |
| 6,223,178 | B1 | 4/2001 | Himmel et al. |
| 6,324,566 | B1 | 11/2001 | Himmel et al. |
| 6,486,891 | B1 | 11/2002 | Rice |
| 6,553,376 | B1 | 4/2003 | Lewis et al. |

(Continued)

FOREIGN PATENT DOCUMENTS

| | | |
|---|---|---|
| EP | 2270741 | 1/2011 |
| JP | 2004-070441 | 3/2004 |

(Continued)

OTHER PUBLICATIONS

M. Baugher et.al, The Secure Real-Time Transport Protocol (SRTP), Mar. 2004, Internet Society, RFC 3711, all.*

(Continued)

*Primary Examiner* — Ashokkumar B Patel
*Assistant Examiner* — William B Jones
(74) *Attorney, Agent, or Firm* — Foley & Lardner LLP (57) ABSTRACT

Methods, systems, and apparatus include computer programs encoded on a computer-readable storage medium, including a method for linking devices. An application, provided to plural devices, is configured to gather account information for services accessed by a given device. Data packages are received from each of a first device and a second different device. Each data package includes a first device identifier and encrypted account information for accounts associated with the device. The account information includes, for a given account, a one-way encrypted account identifier. The encrypted account information associated with the first device is compared with the encrypted account information associated with the second different device to locate one or more matching one-way encrypted identifiers. Based on a comparing, a determination is made that the first device and second different device are associated with a same user, and the first device identifier and second different device identifier are linked.

20 Claims, 4 Drawing Sheets

(56) References Cited

U.S. PATENT DOCUMENTS

| | | |
|---|---|---|
| 7,089,310 B1 | 8/2006 | Ellerman et al. |
| 7,308,261 B2 | 12/2007 | Henderson et al. |
| 7,551,913 B1 | 6/2009 | Chien |
| 7,707,292 B2 | 4/2010 | Henderson et al. |
| 7,711,707 B2 | 5/2010 | Kelley et al. |
| 7,729,977 B2 | 6/2010 | Xiao et al. |
| 7,778,422 B2 | 8/2010 | Freeman et al. |
| 7,861,260 B2 | 12/2010 | Shkedi |
| 7,873,734 B1 | 1/2011 | Eidelman et al. |
| 8,041,602 B2 | 10/2011 | Haley et al. |
| 8,065,185 B2 | 11/2011 | Foladare et al. |
| 8,107,408 B2 | 1/2012 | Chindapol et al. |
| 8,140,389 B2 | 3/2012 | Altberg et al. |
| 8,271,328 B1 | 9/2012 | Baltz et al. |
| 8,321,684 B2 | 11/2012 | Mumm et al. |
| 8,359,274 B2 | 1/2013 | Yoder et al. |
| 8,423,408 B1 | 4/2013 | Barnes et al. |
| 8,438,184 B1 | 5/2013 | Wang et al. |
| 8,606,873 B2 | 12/2013 | Park et al. |
| 8,666,812 B1 | 3/2014 | Gandhi |
| 8,688,984 B2 | 4/2014 | Rajkumar et al. |
| 8,799,456 B2 | 8/2014 | de Jager et al. |
| 8,832,319 B2 | 9/2014 | Kessel et al. |
| 8,862,889 B2 | 10/2014 | Madden |
| 8,892,685 B1 | 11/2014 | Rajkumar et al. |
| 8,966,043 B2 | 2/2015 | Rajkumar et al. |
| 8,978,158 B2 | 3/2015 | Rajkumar et al. |
| 9,009,258 B2 | 4/2015 | Ramachandran et al. |
| 9,087,335 B2 | 7/2015 | Rane et al. |
| 2002/0010776 A1 | 1/2002 | Lerner |
| 2003/0046290 A1 | 3/2003 | Yamada |
| 2003/0061275 A1 | 3/2003 | Brown et al. |
| 2003/0061512 A1 | 3/2003 | Flurry et al. |
| 2003/0149781 A1 | 8/2003 | Yared et al. |
| 2003/0217687 A1 | 11/2003 | Segall |
| 2003/0229900 A1 | 12/2003 | Reisman |
| 2004/0068477 A1 | 4/2004 | Gilmour et al. |
| 2004/0088363 A1 | 5/2004 | Doemling et al. |
| 2004/0122735 A1 | 6/2004 | Meshkin |
| 2004/0123329 A1* | 6/2004 | Williams ............ H04L 12/2801 725/111 |
| 2004/0204997 A1 | 10/2004 | Blaser et al. |
| 2005/0021747 A1 | 1/2005 | Jave |
| 2005/0044423 A1 | 2/2005 | Mellmer et al. |
| 2005/0076248 A1 | 4/2005 | Cahill et al. |
| 2005/0268102 A1 | 12/2005 | Downey |
| 2005/0278731 A1 | 12/2005 | Cameron et al. |
| 2006/0015574 A1 | 1/2006 | Seed et al. |
| 2006/0020782 A1 | 1/2006 | Kakii |
| 2006/0036857 A1 | 2/2006 | Hwang |
| 2006/0080415 A1 | 4/2006 | Tu |
| 2006/0098795 A1 | 5/2006 | Choti et al. |
| 2006/0101287 A1 | 5/2006 | Morten |
| 2006/0136717 A1 | 6/2006 | Buer et al. |
| 2007/0124201 A1 | 5/2007 | Hu et al. |
| 2007/0136305 A1 | 6/2007 | Kelley et al. |
| 2007/0136306 A1 | 6/2007 | Kelley et al. |
| 2007/0174614 A1 | 7/2007 | Duane et al. |
| 2007/0240226 A1 | 10/2007 | Song et al. |
| 2008/0028206 A1 | 1/2008 | Sicard et al. |
| 2008/0052775 A1 | 2/2008 | Sandhu et al. |
| 2008/0098039 A1 | 4/2008 | Kruis et al. |
| 2008/0119167 A1 | 5/2008 | Rao |
| 2008/0140476 A1 | 6/2008 | Anand et al. |
| 2008/0172373 A1 | 7/2008 | Jenson et al. |
| 2008/0172422 A1 | 7/2008 | Li et al. |
| 2008/0172488 A1 | 7/2008 | Jawahar et al. |
| 2008/0235243 A1 | 9/2008 | Lee et al. |
| 2008/0243609 A1 | 10/2008 | Murto et al. |
| 2008/0275753 A1 | 11/2008 | Protheroe et al. |
| 2008/0289019 A1 | 11/2008 | Lam |
| 2008/0313010 A1 | 12/2008 | Jepson et al. |
| 2009/0007217 A1 | 1/2009 | Birger et al. |
| 2009/0048922 A1 | 2/2009 | Morgenstern et al. |
| 2009/0077000 A1 | 3/2009 | Begole et al. |
| 2009/0094642 A1 | 4/2009 | Hobson |
| 2009/0132813 A1 | 5/2009 | Schibuk |
| 2009/0150238 A1 | 6/2009 | Marsh et al. |
| 2009/0157502 A1 | 6/2009 | Cooper et al. |
| 2009/0164557 A1 | 6/2009 | Marlow et al. |
| 2009/0234708 A1 | 9/2009 | Heiser et al. |
| 2009/0234909 A1 | 9/2009 | Strandell et al. |
| 2009/0248496 A1 | 10/2009 | Hueter et al. |
| 2009/0298480 A1 | 12/2009 | Khambete et al. |
| 2009/0298514 A1* | 12/2009 | Ullah ....................... G01S 5/02 455/456.5 |
| 2009/0300745 A1 | 12/2009 | Dispensa |
| 2009/0307759 A1 | 12/2009 | Schnell et al. |
| 2009/0320091 A1 | 12/2009 | Torres et al. |
| 2009/0327391 A1 | 12/2009 | Park et al. |
| 2010/0017596 A1 | 1/2010 | Schertzinger |
| 2010/0057843 A1 | 3/2010 | Landsman et al. |
| 2010/0088519 A1 | 4/2010 | Tsuruoka et al. |
| 2010/0145796 A1 | 6/2010 | Berry et al. |
| 2010/0180009 A1 | 7/2010 | Callahan |
| 2010/0186084 A1 | 7/2010 | Hamid |
| 2010/0199098 A1 | 8/2010 | King |
| 2010/0211457 A1 | 8/2010 | Martin-Cocher et al. |
| 2010/0278336 A1* | 11/2010 | Tahan ................... G06F 21/606 380/46 |
| 2010/0287288 A1 | 11/2010 | Driscoll et al. |
| 2010/0293049 A1 | 11/2010 | Maher et al. |
| 2010/0306048 A1 | 12/2010 | Cordureanu |
| 2010/0313009 A1 | 12/2010 | Combet et al. |
| 2010/0318432 A1 | 12/2010 | Zinkevich et al. |
| 2010/0319056 A1 | 12/2010 | Gillum et al. |
| 2011/0010243 A1 | 1/2011 | Wilburn et al. |
| 2011/0047032 A1 | 2/2011 | Kumar et al. |
| 2011/0055556 A1 | 3/2011 | Choi et al. |
| 2011/0082824 A1 | 4/2011 | Allison et al. |
| 2011/0110515 A1 | 5/2011 | Tidwell et al. |
| 2011/0153428 A1 | 6/2011 | Ramer et al. |
| 2011/0154499 A1 | 6/2011 | Rohan et al. |
| 2011/0213977 A1 | 9/2011 | Little |
| 2011/0231478 A1 | 9/2011 | Wheeler et al. |
| 2011/0246267 A1 | 10/2011 | Williams et al. |
| 2011/0251878 A1 | 10/2011 | Subramanian et al. |
| 2011/0276383 A1 | 11/2011 | Heiser et al. |
| 2011/0289314 A1 | 11/2011 | Whitcomb |
| 2011/0314114 A1 | 12/2011 | Young et al. |
| 2012/0023547 A1 | 1/2012 | Maxson et al. |
| 2012/0030554 A1 | 2/2012 | Toya |
| 2012/0054680 A1 | 3/2012 | Moonka et al. |
| 2012/0060120 A1 | 3/2012 | Aravamudan et al. |
| 2012/0078708 A1 | 3/2012 | Taylor et al. |
| 2012/0096088 A1 | 4/2012 | Fahmy |
| 2012/0096491 A1 | 4/2012 | Shkedi |
| 2012/0109734 A1 | 5/2012 | Fordyce et al. |
| 2012/0158491 A1 | 6/2012 | Goulden et al. |
| 2012/0167185 A1 | 6/2012 | Menezes et al. |
| 2012/0210413 A1 | 8/2012 | Akula et al. |
| 2012/0253920 A1 | 10/2012 | Yarvis et al. |
| 2012/0253926 A1 | 10/2012 | Chen et al. |
| 2012/0321143 A1 | 12/2012 | Krupka et al. |
| 2012/0323674 A1 | 12/2012 | Simmons et al. |
| 2012/0323686 A1 | 12/2012 | Burger et al. |
| 2012/0331287 A1 | 12/2012 | Bowman et al. |
| 2013/0036434 A1 | 2/2013 | Shkedi et al. |
| 2013/0055309 A1 | 2/2013 | Dittus |
| 2013/0061333 A1* | 3/2013 | Davis .................. H04L 63/0861 726/28 |
| 2013/0110623 A1 | 5/2013 | Kilroy et al. |
| 2013/0124309 A1 | 5/2013 | Traasdahl et al. |
| 2013/0124628 A1 | 5/2013 | Weerasinghe |
| 2013/0138957 A1 | 5/2013 | Dharmarajan et al. |
| 2013/0159254 A1 | 6/2013 | Chen et al. |
| 2013/0169434 A1 | 7/2013 | McCown et al. |
| 2013/0179502 A1 | 7/2013 | Faller et al. |
| 2013/0238745 A1 | 9/2013 | Ramachandran et al. |
| 2013/0246527 A1 | 9/2013 | Viera |
| 2013/0252628 A1 | 9/2013 | Kuehnel |
| 2013/0254685 A1 | 9/2013 | Batraski et al. |
| 2013/0290503 A1 | 10/2013 | Rajkumar et al. |
| 2013/0290711 A1 | 10/2013 | Rajkumar et al. |

(56) References Cited

U.S. PATENT DOCUMENTS

| | | | |
|---|---|---|---|
| 2013/0291123 A1 | 10/2013 | Rajkumar et al. | |
| 2013/0332987 A1 | 12/2013 | Tenneti et al. | |
| 2014/0020073 A1 | 1/2014 | Ronda et al. | |
| 2014/0137188 A1* | 5/2014 | Bartholomay | H04L 65/4084 726/3 |
| 2014/0244351 A1 | 8/2014 | Symons | |
| 2014/0281533 A1 | 9/2014 | de Andrade et al. | |
| 2014/0282665 A1 | 9/2014 | Arini | |
| 2015/0067118 A1 | 3/2015 | Gatto et al. | |
| 2015/0170200 A1 | 6/2015 | Rajkumar et al. | |
| 2015/0326395 A1* | 11/2015 | Lemke | H04L 9/0827 713/155 |

FOREIGN PATENT DOCUMENTS

| | | |
|---|---|---|
| JP | 2007-102780 | 4/2007 |
| JP | 2011-096093 | 5/2011 |
| JP | 2012-084085 | 4/2012 |
| KR | 10-0845145 | 7/2008 |
| KR | 10-2011-057854 | 6/2011 |
| KR | 10-2012-0004054 | 1/2012 |
| WO | 98/58334 | 12/1998 |
| WO | 2007/059087 | 5/2007 |
| WO | 2009/052531 | 4/2009 |
| WO | 2011/109865 | 9/2011 |
| WO | 2013/052004 | 4/2013 |

OTHER PUBLICATIONS

J. Rosenbery et.al, SIP: Session Initiation Protocol, Jun. 2002, Internet Society, RFC 3261, all.*

Ebbert, J., "Is Audience Buying Possible in Mobile Advertising?," AdExchanger.com, Aug. 3, 2011 [online] [Retrieved on Dec. 2, 2011]; Retrieved from the Internet URL: http://www.adexchanger.com/mobile/audience-buying/; 9 pages.

Marshall, J., "Device Fingerprinting Could Be Cookie Killer," ClickZ.com, Mar. 2, 2011 [online] [Retrieved on Dec. 2, 2011]; Retrieved from the Internet URL: http://www.clickz.com/clickz/news/2030243/device-fingerprinting-cookie-killer/; 4 pages.

International Search Report in International Application No. PCT/US2013/038461, dated Sep. 17, 2013, 12 pages.

International Search Report in International Application No. PCT/US2013/038457, dated Sep. 17, 2013, 10 pages.

International Search Report in International Application No. PCT/US2013/038482, dated Aug. 12, 2013, 10 pages.

International Search Report and Written Opinion for Application No. PCT/US2013/029384, dated Jun. 17, 2013, 12 pages.

Notification of Transmittal of the International Search Report and the Written Opinion of the International Searching Authority for PCT/US2010/040902 dated Feb. 28, 2013, 9 pages.

Extended European Search Report issued in European Application No. 12796537.4 dated Jan. 8, 2015, 8 pages.

* cited by examiner

LINKING DEVICES USING ENCRYPTED ACCOUNT IDENTIFIERS

CROSS-REFERENCE TO RELATED APPLICATION

This application claims priority to U.S. Provisional Application No. 62/039,870, filed on Aug. 20, 2014. The disclosure of the prior application is considered part of and is incorporated by reference in the disclosure of this application.

BACKGROUND

This specification relates to information presentation.

The Internet provides access to a wide variety of resources. For example, video and/or audio files, as well as webpages for particular subjects or particular news articles, are accessible over the Internet. Access to these resources presents opportunities for other content (e.g., advertisements) to be provided with the resources. For example, a webpage can include slots in which content can be presented. These slots can be defined in the webpage or defined for presentation with a webpage, for example, along with search results. Content in these examples can be of various formats, while the devices that consume (e.g., present) the content can be equally varied in terms of their type and capabilities.

Some users may have more than one device, each used for various purposes. For example, users may use one or more devices to access services that include an account associated with the user.

SUMMARY

In general, one innovative aspect of the subject matter described in this specification can be implemented in methods that include a computer-implemented method for linking identifiers. The method includes providing an application to a plurality of devices, the application configured to gather account information for services accessed by a given device. The method further includes receiving, from a first device, a data package including a first device identifier and encrypted account information for accounts associated with the first device, wherein the encrypted account information includes, for a given account, a one-way encrypted account identifier. The method further includes receiving, from a second different device, a data package including a second different device identifier and encrypted account information for accounts associated with the second different device, wherein the encrypted account information includes, for a given account, a one-way encrypted identifier. The method further includes comparing the encrypted account information associated with the first device with the encrypted account information associated with the second different device to locate one or more matching one-way encrypted identifiers. The method further includes, based on a comparing, determining that the first device and the second different device are associated with a same user. The method further includes linking the first device identifier and the second different device identifier based on the determining.

These and other implementations can each optionally include one or more of the following features. Providing the application can include providing a code snippet to a given device that, when installed, is configured to gather account information for accounts associated with the given device, encrypt the account information, and provide the encrypted account information to a service. The data package can further include, for each account, information that identifies the service associated with the account, and determining can include evaluating service type for each matching one-way encrypted identifier that is located and determining when the service is of a type that is a shared service. Determining can include determining based on a number of matching one-way identifiers that are located. The first device can be a mobile device and the second different device can be a tablet computer, a desktop computer, a laptop computer, a smart television, or a smart watch. The accounts can be associated with one or more of an email service, a messaging service, a media service, a retail service, a shopping portal, a payment service, or a social network. Linking can include linking cookies associated with the first device identifier with cookies associated with the second different device identifier. The method can further include receiving a request for content from either the first device or the second different device, and using the cookie linking when determining content to deliver to a user responsive to the received request. Linking can include storing the first device identifier in association with the second different device identifier and one or more cookies associated with the second different device identifier. Storing the association can include mapping the one or more cookies to both the first device identifier and the second different device identifier. The code snippet can identify accounts or services to be included and accounts or services to be excluded for use in gathering account information.

In general, another innovative aspect of the subject matter described in this specification can be implemented in computer program products that include a computer program product tangibly embodied in a computer-readable storage device and comprising instructions. The instructions, when executed by one or more processors, cause the processor to: provide an application to a plurality of devices, the application configured to gather account information for services accessed by a given device; receive, from a first device, a data package including a first device identifier and encrypted account information for accounts associated with the first device, wherein the encrypted account information includes, for a given account, a one-way encrypted account identifier; receive, from a second different device, a data package including a second different device identifier and encrypted account information for accounts associated with the second different device, wherein the encrypted account information includes, for a given account, a one-way encrypted identifier; compare the encrypted account information associated with the first device with the encrypted account information associated with the second different device to locate one or more matching one-way encrypted identifiers; based on a comparing, determine that the first device and the second different device are associated with a same user; and link the first device identifier and the second different device identifier based on the determining.

These and other implementations can each optionally include one or more of the following features. Providing the application can include providing a code snippet to a given device that, when installed, is configured to gather account information for accounts associated with the given device, encrypt the account information, and provide the encrypted account information to a service. The data package can further include, for each account, information that identifies the service associated with the account, and determining can include evaluating service type for each matching one-way encrypted identifier that is located and determining when the service is of a type that is a shared service. Determining can include determining based on a number of matching one-way identifiers that are located. The first device can be a mobile device and the second different device can be a tablet computer, a desktop computer, a laptop computer, a smart television, or a smart watch.

In general, another innovative aspect of the subject matter described in this specification can be implemented in systems, including a system comprising one or more processors and one or more memory elements including instructions. The instructions, when executed, cause the one or more processors to: provide an application to a plurality of devices, the application configured to gather account information for services accessed by a given device; receive, from a first device, a data package including a first device identifier and encrypted account information for accounts associated with the first device, wherein the encrypted account information includes, for a given account, a one-way encrypted account identifier; receive, from a second different device, a data package including a second different device identifier and encrypted account information for accounts associated with the second different device, wherein the encrypted account information includes, for a given account, a one-way encrypted identifier; compare the encrypted account information associated with the first device with the encrypted account information associated with the second different device to locate one or more matching one-way encrypted identifiers; based on a comparing, determine that the first device and the second different device are associated with a same user; and link the first device identifier and the second different device identifier based on the determining.

These and other implementations can each optionally include one or more of the following features. Providing the application can include providing a code snippet to a given device that, when installed, is configured to gather account information for accounts associated with the given device, encrypt the account information, and provide the encrypted account information to a service. The data package can further include, for each account, information that identifies the service associated with the account, and determining can include evaluating service type for each matching one-way encrypted identifier that is located and determining when the service is of a type that is a shared service. Determining can include determining based on a number of matching one-way identifiers that are located.

Particular implementations may realize none, one or more of the following advantages. Users can be provided with content that is more relevant and/or interesting when the content selected is based, at least in part, on interactions undertaken on all or several of their associated devices, such devices being linked based on common account information gathered from (and encrypted for) different devices.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Systems, methods, and computer program products are described for linking devices. Specifically, linking the devices can occur by matching encrypted account information for the same user that is received from plural devices, e.g., without identifying the user using personal information or account information. For example, an application that is configured to gather account information for services accessed by a given device can be provided to plural devices. Account information that is gathered when the application runs on a given device can include information associated with a user's access to an account. User accounts can be associated, for example, with an email service, a messaging service, a media service, a retail service, a shopping portal, a payment service, a social network, an online service, or some other service that requires the user to establish and access an account. As the application runs on each of the plural devices (e.g., associated with the same user), data packages can be generated that are received, e.g., at a content management system. The data packages received from each of first and second different devices can include first and second different device identifiers and encrypted account information captured by the application for each device. The account information can include, for a given account, a one-way encrypted account identifier, e.g., that is encrypted by the application. The encrypted account information associated with the first device can be compared with the encrypted account information associated with the second different device to locate one or more matching one-way encrypted identifiers. Matching identifiers that are located can indicate, for example, that the user has accessed the same account from the two different devices. A determination can be made, for example, that the first device and second different device are associated with a same user, and the first device identifier and second different device identifier can be linked.

Account information can be associated with accounts and services. For example, for the email address somebody@examplemail.com, "examplemail.com" is the service (which may or may not be privacy sensitive), and "somebody" is the account name for the service. In some implementations, before devices send both account names and services to a server, for example, a one-way crypto hash can be applied to each. "Hash" or "encryption" used herein can refer to a one-way crypto hash, which cannot be decrypted by a server, thus preserving user privacy.

For situations in which the systems discussed here collect and/or use personal information about users, the users may be provided with an opportunity to enable/disable or control programs or features that may collect and/or use personal information (e.g., information about a user's social network, social actions or activities, a user's preferences or a user's current location). In addition, certain data may be treated in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

In some implementations, users can designate, for example, that their devices are permitted to be linked and/or a degree by which (or purpose for) the devices are allowed to be linked. In some implementations, a data store of user preferences can include information that the user has provided regarding if and how information about the user's different devices can be used. For example, a user can set a preference that indicates no linking or selectively identify which devices are allowed (or not allowed) to be linked (and for what purposes). In some implementations, users can set constraints and/or rules related to when and how linking occurs and the use of the linked information. For example, rules can be specified to not link devices, not link certain accounts, or otherwise control when or how linking happens and the use of the linking. In some implementations, before any operation is performed that may link the user's different devices, the user's preferences can be checked, and the linking will be performed only if allowed by current user preferences. In some implementations, the user may specify settings that prohibit or limit content that is provided based on the linking. For example, while the user may allow his smart phone and PC to be linked, the user may decide that no content (e.g., advertisements) should be provided based on the linking.

Figure 1:
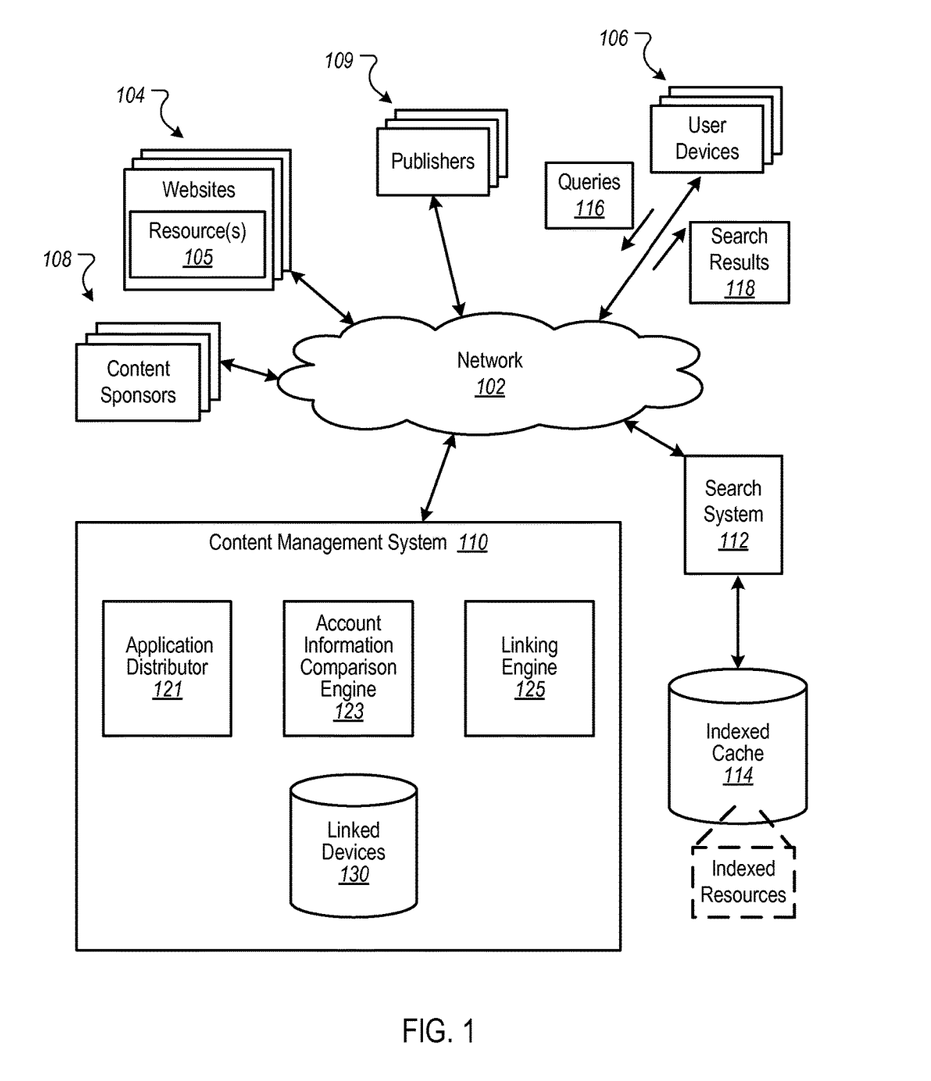
FIG. 1 is a block diagram of an example environment for providing content.

FIG. 1 is a block diagram of an example environment 100 for providing content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104 (e.g., addressable resources), user devices 106, content sponsors 108 (e.g., advertisers), publishers 109, and the content management system 110. The example environment 100 may include many thousands of websites 104, user devices 106, content sponsors 108 and publishers 109.

The environment 100 can include plural data stores, which can be stored locally by the content management system 110, stored somewhere else and accessible using the network 102, generated as needed from various data sources, or some combination of these. Further, some data stores described herein may include identifiers that can be used to match or access corresponding data records or other information that are stored elsewhere, e.g. locally and/or remotely.

A data store of linked devices 130, for example, can include information that links different devices, e.g., user devices 106 and/or other mobile and/or non-mobile computer devices used by users. The information can include, for example, encrypted account identifiers for accounts associated with users. Other information can include device identifiers that are linked, e.g., by having the same encrypted account identifiers. Other information included in the linking can include cookies, timestamps associated with times that linking information is added or updated, and other information. In some implementations, entries in the data store of linked devices 130 can be purged, e.g., when entries reach a threshold age. In some implementations, entries can be prevented from being saved or can be deleted when it is determined that multiple users are likely using the same device, such as a shared computer in a public library.

The content management system 110 can include plural engines, some or all of which may be combined or separate, and may be co-located or distributed (e.g., connected over the network 102). An application distributor 121, for example, can provide an application to a device, the application being operable to gather account information for services accessed by a given device. For example, the application distributor 121 can provide the application on demand, e.g., when requested by a given device. In some implementations, the application can be pushed to a given device routinely, e.g., with or without other content that is provided to the given device. Alternatively, applications can be natively provisioned on a given device.

An account information comparison engine 123, for example, can determine that a first device and a second different device are associated with a same user. The determination can be made, e.g., using information from data packages that are received from the respective devices. For example, the determination can be made when encrypted account information, including encrypted account identifiers, are matched in data packages received from a first device and a second different device. Matching is described in greater detail below.

A linking engine 125, for example, can link first and second different device identifiers, e.g., associated with encrypted account identifiers that are matched from data packages received from the devices. For example, linking the device identifiers can include storing linking information along with corresponding encrypted account identifiers, e.g., in the data store of linked devices 130. Once devices are linked, for example, the linking can be used in various ways, including for selecting and providing content to users, as described below. For example, linking information can be used in conversion tracking, frequency capping, and/or other uses associated with linked devices.

A website 104 includes one or more resources 105 associated with a domain name and hosted by one or more servers. An example website is a collection of webpages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, gaming consoles, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or webpage, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 can, for example, access the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is provided in response to a particular search query, and includes a link to the resource. Search results pages can also include one or more slots in which other content items (e.g., advertisements) can be presented.

When a resource 105, search results 118 and/or other content (e.g., a video) are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110 in association with a given request. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In addition, when no search is performed or no keywords are available (e.g., because the user is not browsing a webpage), other information, such as information obtained from one or more snapshots, can be used to respond to the received request. In some implementations, the selection of the eligible content items can further depend on user signals, such as demographic signals, behavioral signals or other signals derived from a user profile.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations and a value of learning). The offers represent the amounts that the content sponsors are willing to pay for presentation of (or selection of or other interaction with) their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a webpage, and consummates a purchase there before leaving that webpage. A conversion can also be defined by a content provider to be any measurable or observable user action, such as downloading a white paper, navigating to at least a given depth of a website, viewing at least a certain number of webpages, spending at least a predetermined amount of time on a web site or webpage, registering on a website, experiencing media, or performing a social action regarding a content item (e.g., an ad), such as endorsing, republishing or sharing the content item. Other actions that constitute a conversion can also be used.

Figure 2:
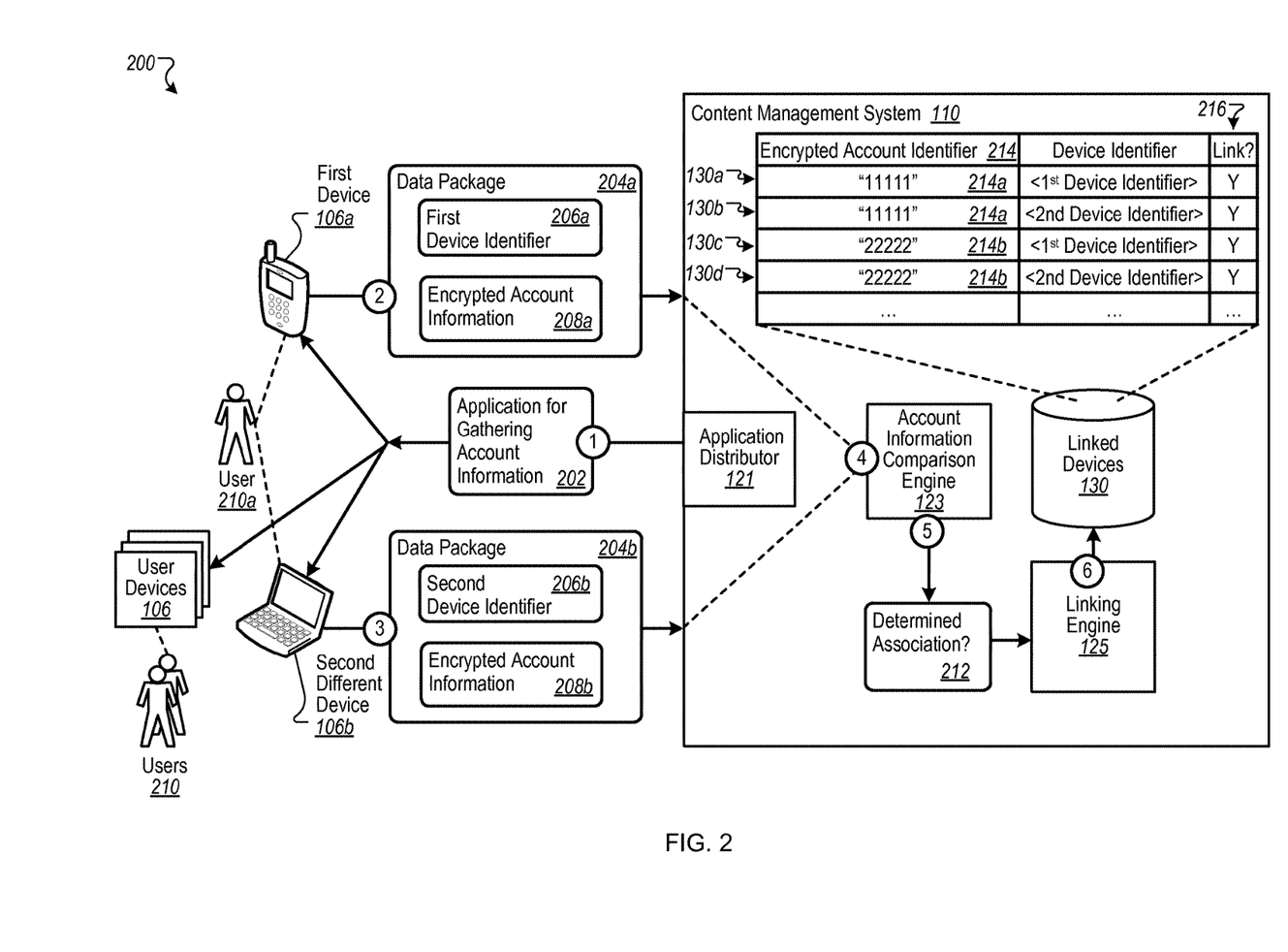
FIG. 2 shows an example system for linking devices based on matching encrypted account identifiers that are received from the devices

FIG. 2 shows an example system 200 for linking devices. Devices can be linked, for example, by matching encrypted account information received from the devices. For example, an application 202 that is provided to/associated with a first device 106a and a second different device 106b can gather information associated with user accounts accessed on a respective device. The information gathered at the devices can include information used, for example, for generating data packages 204a and 204b that include encrypted account information 208a and 208b, respectively. The data packages 204a and 204b can be received and evaluated at the content management system 110. When a match is determined in encrypted account identifiers included in the encrypted account information 208a and 208b, for example, the corresponding devices can be linked. In some implementations, the following example stages can be used for linking devices.

At stage 1, for example, the application distributor 121 can provide the application 202 to the first device 106a and the second different device 106b. For example, the application distributor 121 can provide the application 202 to plural devices 106 used by plural users 210. The application 202 can be configured to gather account information for services accessed by a given device 106. In some implementations, the application 202 can be provided along with other information provided by the content management system 110, such as when a particular user device 106 receives content (e.g., an advertisement) from the content management system 110, e.g., for the first time. In some implementations, the application 202 can be provided at a time in which a user 210a authorizes the linking of devices or otherwise authorizes gathering of user information, such as for use in linking user devices associated with the user 210a. The user 210a may authorize linking, for example, to enable the content management system 110 to provide content that is more relevant and interesting to the user 210a.

At stage 2, for example, the content management system 110 can receive the data package 204a from the first device 106a. The data package 204a can include a first device identifier 206a (e.g., associated with the first device 106a) and encrypted account information 208a for accounts associated (with the user 210a using) the first device 106a. For example, the encrypted account information 208a can include, for a given account, a one-way encrypted account identifier. The encryption can be performed, for example, by the application 202 that is provided to, and executes on, the first device 106a. For example, a one-way hash function can be applied to specific account information for a user to create the encrypted account identifier.

At stage 3, for example, the content management system 110 can receive the data package 204b from the second different device 106b. The data package 204b can include a second device identifier 206b (e.g., associated with the second different device 106b) and encrypted account information 208b for accounts associated with the second different device 106b, e.g., including accounts associated with the user 210a. The encrypted account information 208b can include, for a given account, a one-way encrypted account identifier. The encryption can be performed, for example, by the application 202 that is provided to, and executes on, the second different device 106b.

At stage 4, for example, the account information comparison engine 123 can compare the encrypted account information 208a and 208b associated with the devices 106a and 106b, respectively. The comparing can include locating one or more matching one-way encrypted identifiers, e.g., an encrypted account identifier 214a (e.g., "11111") that is included in the data packages received from the devices 106a and 106b. For example, the encrypted identifiers that can be matched can include account identifiers that have been encrypted by the application 202 on respective ones of the devices 106.

At stage 5, for example, based on a comparing, the account information comparison engine 123 can determine (212) that the first device 106a and the second different device 106b are associated with a same user (e.g., user 210a). The determination can occur over time, e.g., as data packages 204a and 204b are received from respective ones of the user devices 106. For example, associating two or more user devices 106 can be based on data packages that are received minutes, hours or days apart, e.g., as each user 210 uses a respective user device 106 and the application 202 subsequently creates a data package. The determination can be based, for example, on comparing and matching encrypted account identifiers 214a (e.g., "11111") in both data packages 204a and 204b. At this stage, processing may include screening of received device identifiers to locate shared devices (i.e., devices that are accessed by more than one user, such as a public library computer). Screening can include, for example, determining if the same computer logs into several different mail accounts within the same day, which can indicate that the computer is most likely a shared computer. In another example, screening associated with actual applications can include the use of statistical models that determine if multiple different users are using the same application on the same device.

At stage 6, for example, the linking engine 125 can link the first device identifier 206a and the second device identifier 206b based on the determining. For example, linking the first device identifier 206a and the second device identifier 206b can be done by storing information for the corresponding encrypted account identifiers 214a (e.g., "11111") in entries 130a and 130b that correspond to the first device 106a and the second different device 106b, respectively. Linked devices can be represented in the data store of linked devices 130, for example, by setting a link field 216 for linked devices to an affirmative value when entries (e.g., entries 130a and 130b) in the data store of linked devices 130 have identical values for the encrypted account identifiers 214.

Figure 3:
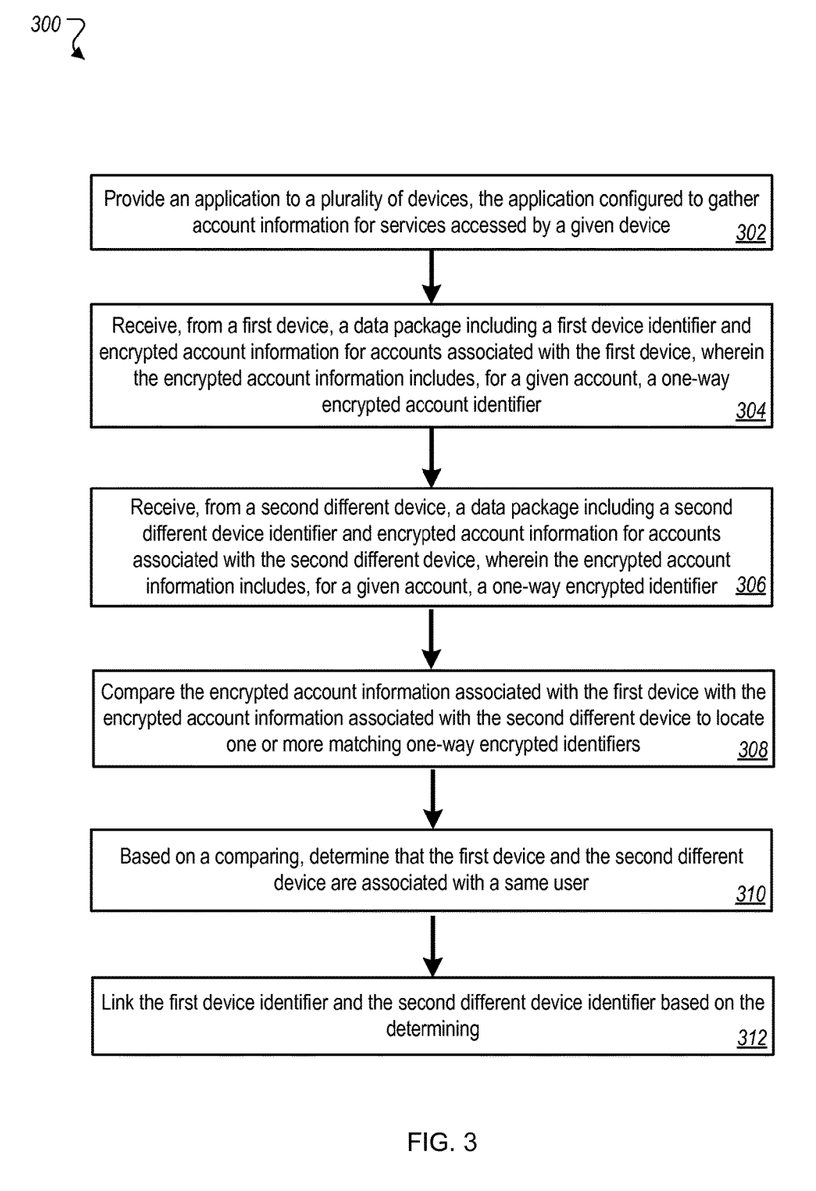
FIG. 3 is a flowchart of an example process for linking devices based on matching encrypted account identifiers that are received from the devices.

FIG. 3 is a flowchart of an example process 300 for linking devices based on matching encrypted account identifiers that are received from the devices. In some implementations, the content management system 110 can perform steps of the process 300 using instructions that are executed by one or more processors. FIGS. 1-2 are used to provide example structures for performing the steps of the process 300.

An application is provided to (or otherwise provisioned on) a plurality of devices, the application configured to gather account information for services accessed by a given device (302). The application distributor 121, for example, can provide the application 202 to plural devices 106, including the first device 106a and the second different device 106b. The application 202 can be operable to gather account information for services accessed by a given device 106. In some implementations, the application can include multiple applications and/or other services/processes on websites, all of which can provide information to a central entity that establishes device linking (e.g., cookie linking) In some implementations, gathering account information on a website can be triggered, for example, by the user clicking "log in" or performing some other action.

In some implementations, providing the application can include providing a code snippet to a given device that, when installed, is configured to gather account information for accounts associated with the given device, encrypt the account information, and provide the encrypted account information to a service. As an example, the application 202 can include code that, with authorization by the user 210a, invokes application programming interfaces (APIs provided by the operating system) or other applications to programmatically retrieve accounts configured on the device. In some implementations, determining that a user is entering account information can be determined by examining the name of an input field, e.g., by examining a label associated with the given field.

In some implementations, the code snippet can identify accounts or services to be included and accounts or service to be excluded for use in gathering account information, such as by way of a control list or other such structure. For example, the code snippet in the application 202 can use (and/or access from a network resource) a list of accounts. The list of accounts can be generated based on preferences set by the user, for example. The list of accounts can be periodically refreshed to reflect the current preferences of the user. In some implementations, certain types of accounts are not linked. In some implementations, determining which accounts to include or exclude can be determined by evaluating a domain or universal resource locator (URL), e.g., to determine when a user is on a web page (e.g., a service) known to be associated with user accounts. For example, the application 202 can use the URL or domain to identify the type or source of the account, and then begin gathering data that may include the account information.

The application 202 can use information gathered from user devices to build an initial list of accounts for the user. The list of accounts, for example, can include account information, such as the type of account, an account identifier, and other information. Over time, the application 202 can periodically provide data packages (e.g., 204a and 204b) to the content management system 110. During the gathering process and before gathering a particular piece of information, the application 202 can routinely check preferences for the user just before opportunities to gather information. For example, if the user preferences specify not to gather account information from ExampleWebsite.com, and the user happens to be on that website (e.g., potentially entering account information), then the application 202 can refrain from gathering information.

A data package is received from a first device, the data package including a first device identifier and encrypted account information for accounts associated with the first device (304). In some implementations, the encrypted account information can include, for a given account, a one-way encrypted account identifier. As an example, the content management system 110 can receive the data package 204a from the first device 106a. The data package 204a can include a first device identifier 206a and encrypted account information 208a for accounts associated with the first device 106a, as described above.

In some implementations, the accounts can be associated with one or more of an email service, a messaging service, a media service, a retail service, a shopping portal, a payment service, a social network, an online service, or any online services that require user registration and log in. For example, accounts can be associated with a service or an organization that requires a user to establish an account that includes a user name and/or user identifier, such as a password or any other way for the service to identify the user.

A data package is received from a second different device, the data package including a second different device identifier and encrypted account information for accounts associated with the second different device (306). In some implementations, the encrypted account information includes, for a given account, a one-way encrypted identifier. As an example, the content management system 110 can receive the data package 204b from the second different device 106b. The data package 204b can include a second device identifier 206b and encrypted account information 208b for accounts associated with the second different device 106b, as described above.

In some implementations, the first device can be a mobile device, and the second different device can be a tablet computer, a desktop computer, a laptop computer, a smart television, a smart watch, another mobile device, or some other computer or processing device. For example, the first device 106a and the second different device 106b can be two of plural user devices 106 of the same or different device types used by the same user 210a.

The encrypted account information associated with the first device is compared with the encrypted account information associated with the second different device to locate one or more matching one-way encrypted identifiers (308). The account information comparison engine 123, for example, can compare the encrypted account information 208a and 208b associated with the devices 106a and 106b, respectively. For example, the comparing can include matching the encrypted account identifier 214a (e.g., "11111") that is included in the data packages 204a and 204b, e.g., embedded within the encrypted account information 208a and 208b.

Based on a comparing, a determination is made that the first device and the second different device are associated with a same user (310). As an example, because the encrypted account identifier 214a (e.g., "11111") is the same for entries 130a and 130b, the account information comparison engine 123 can determine that both the first device 106a and the second different device 106b are associated with the user 210a.

In some implementations, the data package can further include, for each account, information that identifies the service associated with the account, and determining that the first device and the second different device are associated with a same user can include evaluating a service type for each matching one-way encrypted identifier that is located and determining when the service is of a type that is a shared service. As an example, the application 202 can include, in the data packages 204a and 204b, information that identifies the type of service associated with each of the encrypted account information 208a and 208b. When the data packages 204a and 204b are received, for example, the account information comparison engine 123 can determine that the services are of a nature that they should not be linked or have been designated not to be linked. In some implementations, for some shared services (e.g., family members sharing a same video account), the account may not be used to link multiple cookies to the same person. However, the account can be used to link multiple cookies to the same household.

In some implementations, determining that the first device and the second different device are associated with a same user can include making the determination based on a number of matching one-way identifiers that are located. As an example, the linking engine 125 can defer associating the first device 106a and the second different device 106b with the user 210a until at least a minimum number (e.g., two or more) encrypted account identifiers 214 are associated with the devices. For example, based on the deferred associations, the linking engine 125 can delay setting the link field 216 for entries 130a-130d until after encrypted account identifiers 214a and 214b are associated with both devices 106a and 106b.

The first device identifier and the second different device identifier are linked based on the determining (312). For example, when the first device 106a and the second different device 106b are determined to be associated with the user 210a, the linking engine 125 can set the link field 216 for the corresponding ones of the entries 130a-130d.

In some implementations, linking the identifiers can include linking cookies associated with the first device identifier with cookies associated with the second different device identifier. For example, the entries in the data store of linked devices 130 can include a cookie field that can be linked for corresponding ones of the entries. The cookie field can be used for linking cookies associated with account-related services on the first device 106a and the second different device 106b.

In some implementations, the process 300 can further include receiving a request for content from either the first device or the second different device, and using the cookie linking when determining content to deliver to a user responsive to the received request. For example, the content management system 110 can receive a request for content from either of the devices 106a or 106b. The request for content, for example, can be a request for an advertisement to fill an advertisement slot, such as in a browser, web page or other resource on the device. The content management system 110 can use cookie linking associated with the devices 106a or 106b, for example, in order to select content responsive to the request (e.g., using information stored in either or both cookies to determine relevant content to deliver).

In some implementations, linking the identifiers can include storing the first device identifier in association with the second different device identifier and one or more cookies associated with the second different device identifier. For example, entries in the linked devices can include setting link fields associated with the devices and their corresponding cookies.

In some implementations, storing the association can include mapping the one or more cookies to both the first device identifier and the second different device identifier. Entries in the data store of linked devices 130, for example, can link corresponding ones of the cookies to both of the first device 106a and the second different device 106b.

In some implementations, account information gathered on websites, for example, does not rely on a single application. For example, websites would not all make use of a single application that is distributed to all multiple devices for the purpose of linking the devices. Instead, different applications from different companies can each include the necessary functionality that may be implemented, for example, using a common library licensed from a third party. Each of the applications can implement device-side logic to facilitate linking. In addition, a website can implement necessary logic so that a third party can link application cookies and web browser cookies together.

For example, on a particular website, a user may type in a user name and a password on the website main page, then click a "log in" button. The user's browser can send the request to the server. The server can authenticate the user based on the user name and password received in the request. In conventional systems not having the account linking described herein, the server can send a response to the request that redirects the browser to another page for authenticated users only where user-specific content will be shown.

However, using the linking described herein, the server can send a response to the request, for example, that redirects the browser to a re-directed URL for the linking system (e.g., the content management system 110). The URL can contain two parameters, e.g., the user name and the website domain name with a one-way crypto hash applied, and the website URL for authenticated users only. The user's browser can send a request to the linking system with the above two parameters. The browser can automatically attach the cookie previously dropped into the user's browser to the request heading toward the linking system. The linking system server can receive the request from which a linking system server can extract the one-way crypto hashed user account ID and service, plus the cookie. The linking system server can record the information, for example, as entries 130a, 130b. The linking system server can send a response back to user browser that redirects the browser to the website's URL for authenticated users only. Later, when the user logs into the same website from another browser (or using the website's application that also implements the linking described herein), the linking system server will be able to link the second browser cookie and the application cookie to the first browser cookie.

Figure 4:
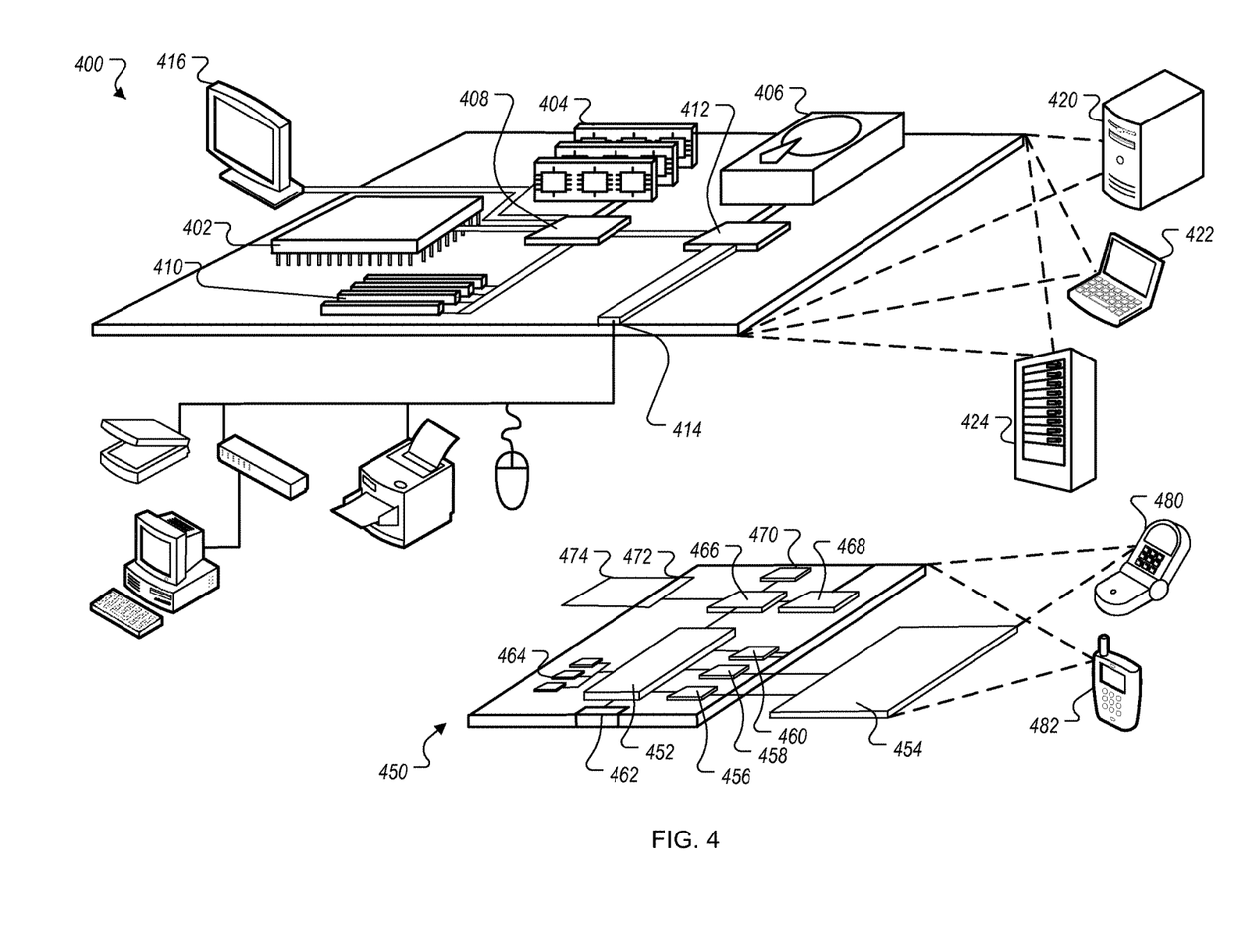
FIG. 4 is a block diagram of an example computer system that can be used to implement the methods, systems and processes described in this disclosure.

FIG. 4 is a block diagram of example computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processers embedded therein or attached thereto. Computing device 450 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed controller 408 connecting to memory 404 and high-speed expansion ports 410, and a low-speed controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of duties is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed bus 414 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as computing device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the computing device 450, such as control of user interfaces, applications run by computing device 450, and wireless communication by computing device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of computing device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to computing device 450 through expansion interface 472, which may include, for example, a subscriber identification module (SIM) card interface. Such expansion memory 474 may provide extra storage space for computing device 450, or may also store applications or other information for computing device 450. Specifically, expansion memory 474 may include instructions to carry out or supplement the processes described above, and may include secure information also. Thus, for example, expansion memory 474 may be provide as a security module for computing device 450, and may be programmed with instructions that permit secure use of computing device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 468 (e.g., a radio-frequency transceiver). In addition, short-range communication may occur, such as using a Bluetooth®, WiFi, or other such transceiver (not shown). In addition, GPS receiver module 470 may provide additional wireless data to computing device 450, which may be used as appropriate by applications running on computing device 450.

Computing device 450 may also communicate audibly using audio codec 460, which may receive spoken information from a user and convert it to usable digital information. Audio codec 460 may likewise generate audible sound for a user, such as through a speaker, e.g., in a handset of computing device 450. Such sound may include sound from voice telephone calls, may include recorded sound (e.g., voice messages, music files, etc.) and may also include sound generated by applications operating on computing device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
providing an application to a plurality of devices, the application configured to gather account information for services accessed by a given device;
receiving, by a server from a first device, a data package including a first device identifier and a first one-way encrypted account identifier for accounts associated with the first device, wherein account information from the accounts is used, by the first device, to generate the first one-way encrypted account identifier, and wherein the server is unable to decrypt the first one-way encrypted account identifier;
receiving, by the server from a second different device, a data package including a second different device identifier and a second one-way encrypted account identifier generated by the second different device, and wherein the server is unable to decrypt the second one-way encrypted account identifier;
comparing, by the server, the first one-way encrypted account identifier to the second one-way encrypted account identifier;
responsive to the first one-way encrypted account identifier matching the second one-way encrypted account identifier, determining, by the server based on the comparison, that the first device and the second different device are associated with a same user; and
linking, by the server, cookies associated with account-related services of the first device with cookies associated with account-related services of the second different device based on the determination that the first device and the second different device are associated with the same user.

2. The method of claim 1 wherein providing the application includes providing a code snippet to a given device that, when installed, is configured to gather account information for accounts associated with the given device, encrypt the account information, and provide the encrypted account information to a service.

3. The method of claim 1 wherein the data package further includes, for each account, information that identifies the service associated with the account, and wherein determining that the first device and the second different device are associated with a same user includes evaluating a service type for the first one-way encrypted account identifier and the second one-way encrypted account identifier and determining that the service type identifies a shared service.

4. The method of claim 1 wherein determining that the first device and the second different device are associated with a same user includes determining that the first device and the second different device are associated with a same user, responsive to identifying a match between a plurality of one-way encrypted account identifiers.

5. The method of claim 1 wherein the first device is a mobile device and the second different device is a tablet computer, a desktop computer, a laptop computer, a smart television, or a smart watch.

6. The method of claim 1 wherein the accounts are associated with one or more of an email service, a messaging service, a media service, a retail service, a shopping portal, a payment service, or a social network.

7. The method of claim 1 wherein linking the first device identifier and the second different device identifier includes linking cookies associated with the first device identifier with cookies associated with the second different device identifier.

8. The method of claim 7 further comprising receiving a request for content from either the first device or the second different device, and using the cookie linking when determining content to deliver to a user responsive to the received request.

9. The method of claim 7 wherein linking the first device identifier and the second different device identifier includes storing the first device identifier in association with the second different device identifier and one or more cookies associated with the second different device identifier.

10. The method of claim 9 wherein storing the association includes mapping the one or more cookies to both the first device identifier and the second different device identifier.

11. The method of claim 2 wherein the code snippet identifies accounts or services to be included and accounts or services to be excluded for use in gathering account information.

12. A computer program product embodied in a non-transitive computer-readable medium including instructions, that when executed, cause one or more processors to:
provide an application to a plurality of devices, the application configured to gather account information for services accessed by a given device;
receive, by a server from a first device, a data package including a first device identifier and a first one-way encrypted account identifier for accounts associated with the first device, wherein account information from the accounts is used, by the first device, to generate the first one-way encrypted account identifier, and wherein the server is unable to decrypt the first one-way encrypted account identifier;
receive, by the server from a second different device, a data package including a second different device identifier and a second one-way encrypted account identifier generated by the second different device, and wherein the server is unable to decrypt the second one-way encrypted account identifier;
compare, by the server, the first one-way encrypted account identifier to the second one-way encrypted account identifier;
responsive to the first one-way encrypted account identifier matching the second one-way encrypted account identifier, determine, by the server based on the comparison, that the first device and the second different device are associated with a same user; and
link, by the server, cookies associated with account-related services of the first device with cookies associated with account-related services of the second different device based on the determination that the first device and the second different device are associated with the same user.

13. The computer program product of claim 12 wherein providing the application includes providing a code snippet to a given device that, when installed, is configured to gather account information for accounts associated with the given device, encrypt the account information, and provide the encrypted account information to a service.

14. The computer program product of claim 12 wherein the data package further includes, for each account, information that identifies the service associated with the account, and wherein determining that the first device and the second different device are associated with a same user includes evaluating a service type for the first one-way encrypted account identifier and the second one-way encrypted account identifier and determining that the service type identifies a shared service.

15. The computer program product of claim 12 wherein determining that the first device and the second different device are associated with a same user includes determining that the first device and the second different device are associated with a same user, responsive to identifying a match between a plurality of one-way encrypted account identifiers.

16. The computer program product of claim 12 wherein the first device is a mobile device and the second different device is a tablet computer, a desktop computer, a laptop computer, a smart television, or a smart watch.

17. A system comprising:
one or more processors of a server; and
one or more memory elements including instructions that, when executed, cause the one or more processors to:
provide an application to a plurality of devices, the application configured to gather account information for services accessed by a given device;
receive, from a first device, a data package including a first device identifier and a first one-way encrypted account identifier for accounts associated with the first device, wherein account information from the accounts is used, by the first device, to generate the first one-way encrypted account identifier, and wherein the server is unable to decrypt the first one-way encrypted account identifier;
receive, from a second different device, a data package including a second different device identifier and a second one-way encrypted account identifier generated by the second different device, and wherein the server is unable to decrypt the second one-way encrypted account identifier;
compare the first one-way encrypted account identifier to the second one-way encrypted account identifier;
responsive to the first one-way encrypted account identifier matching the second one-way encrypted account identifier, determine, based on the comparison, that the first device and the second different device are associated with a same user; and
link cookies associated with account-related services of the first device with cookies associated with account-related services of the second different device based on the determination that the first device and the second different device are associated with the same user.

18. The system of claim 17 wherein providing the application includes providing a code snippet to a given device that, when installed, is configured to gather account information for accounts associated with the given device, encrypt the account information, and provide the encrypted account information to a service.

19. The system of claim 17 wherein the data package further includes, for each account, information that identifies the service associated with the account, and wherein determining that the first device and the second different device are associated with a same user includes evaluating a service type for the first one-way encrypted account identifier and the second one-way encrypted account identifier and determining that the service type identifies a shared service.

20. The system of claim 17 wherein determining that the first device and the second different device are associated with a same user includes determining that the first device and the second different device are associated with a same user, responsive to identifying a match between a plurality of one-way encrypted account identifiers.

* * * * *